(12) United States Patent
Sepa et al.

(10) Patent No.: US 9,672,950 B2
(45) Date of Patent: Jun. 6, 2017

(54) LOW-HAZE TRANSPARENT CONDUCTORS (71) Applicant: CAM Holding Corporation, Tortola OT (VG)

(72) Inventors: Jelena Sepa, Mountain View, CA (US); Frank Wallace, San Francisco, CA (US)

(73) Assignee: CAM Holding Corporation, Tortola (VG)

( * ) Notice: Subject to any disclaimer, the term of this patent is extended or adjusted under 35 U.S.C. 154(b) by 580 days.

(21) Appl. No.: 13/934,678

(22) Filed: Jul. 3, 2013

(65) Prior Publication Data

US 2013/0291683 A1 Nov. 7, 2013

Related U.S. Application Data (62) Division of application No. 13/007,305, filed on Jan. 14, 2011.

(60) Provisional application No. 61/295,634, filed on Jan. 15, 2010.

(51) Int. Cl.
*C21B 13/00* (2006.01)
*H01B 1/02* (2006.01)
*H01B 1/22* (2006.01)
*B22F 9/20* (2006.01)
*C09D 11/52* (2014.01)

(52) U.S. Cl.
CPC ............... *H01B 1/02* (2013.01); *B22F 9/20* (2013.01); *C09D 11/52* (2013.01); *H01B 1/22* (2013.01); *Y10T 428/298* (2015.01)

(58) Field of Classification Search
USPC ................... 75/300, 343; 419/24; 134/34
See application file for complete search history.

(56) References Cited

U.S. PATENT DOCUMENTS

| 7,849,424 | B2 | | 12/2010 | Wolk et al. |
| 8,454,721 | B2 * | | 6/2013 | Allemand ............... 75/343 |
| 2005/0056118 | A1 | | 3/2005 | Xia et al. |
| 2007/0074316 | A1 | | 3/2007 | Alden et al. |
| 2008/0143906 | A1 | | 6/2008 | Allemand et al. |
| 2008/0210052 | A1 | | 9/2008 | Allemand |
| 2008/0259262 | A1 | | 10/2008 | Jones et al. |
| 2009/0052029 | A1 | | 2/2009 | Dai et al. |
| 2009/0223703 | A1 | | 9/2009 | Winoto |
| 2009/0242231 | A1 | | 10/2009 | Miyagisima et al. |
| 2009/0283304 | A1 | | 11/2009 | Winoto |
| 2009/0321113 | A1 * | | 12/2009 | Allemand ............... 174/257 |
| 2010/0243295 | A1 | | 9/2010 | Allemand et al. |
| 2010/0307792 | A1 | | 12/2010 | Allemand et al. |
| 2011/0024159 | A1 | | 2/2011 | Allemand et al. |
| 2011/0042126 | A1 | | 2/2011 | Spaid et al. |
| 2011/0045272 | A1 | | 2/2011 | Allemand |
| 2011/0048170 | A1 | | 3/2011 | Bhatia et al. |
| 2011/0163403 | A1 | | 7/2011 | Bhatia et al. |

FOREIGN PATENT DOCUMENTS

| JP | 2007-8986 A | 1/2007 |
| JP | 2009-129732 A | 6/2009 |
| JP | 2009-135099 A | 6/2009 |
| WO | 2008/046058 A2 | 4/2008 |
| WO | 2009/108304 A1 | 9/2009 |
| WO | 2011/066010 A1 | 6/2011 |

OTHER PUBLICATIONS

Allemand et al., "Reliable and Durable Conductive Films Comprising Metal Nanostructures," U.S. Appl. No. 61/175,745, filed May 5, 2009, 36 pages.
Sepa et al., "Methods of Controlling Nanostructure Formations and Shapes," U.S. Appl. No. 61/275,093, filed Aug. 25, 2009, 25 pages.
Sun et al., "Uniform Silver Nanowires Synthesis by Reducing $AgNo_3$ with Ethylene Glycol in the Presence of Seeds and Poly(Vinyl Pyrrolidone)," *Chem. Mater.* 14(11): 4736-4745, 2002.
Sun et al., "Crystalline Silver Nanowires by Soft Solution Processing," *Nano Letters* 2(2): 165-168, 2002.

* cited by examiner

*Primary Examiner* — Monique Peets
(74) *Attorney, Agent, or Firm* — Cooper Legal Group, LLC (57) ABSTRACT This disclosure is related to low-haze transparent conductors, ink compositions and method for making the same.

10 Claims, 8 Drawing Sheets

LOW-HAZE TRANSPARENT CONDUCTORS

CROSS-REFERENCE TO RELATED APPLICATION

This application is a divisional of U.S. patent application Ser. No. 13/007,305, filed Jan. 14, 2011, now pending, which application claims the benefit under 35 U.S.C. §119 (e) of U.S. Provisional Patent Application No. 61/295,634 filed Jan. 15, 2010, which is incorporated herein by reference in its entirety.

BACKGROUND

Technical Field

This disclosure is related to low-haze transparent conductors, and ink compositions and method for making the same.

Description of the Related Art

Transparent conductors are optically clear and electrically conductive films. They are in widespread use in areas of display, touch-panel, photovoltaic (PV), various types of e-paper, electrostatic shielding, heating or anti-reflective coatings (e.g., windows), etc. Various technologies have produced transparent conductors based on one or more conductive media such as metallic nanostructures, transparent conductive oxides (e.g., via sol-gel approach), conductive polymers, and/or carbon nanotubes. Generally, a transparent conductor further includes a transparent substrate on which the conductive film is deposited or coated.

Depending on the end use, transparent conductors can be created with predetermined electrical and optical characteristics, including, for example, sheet resistance, optical transparency, and haze. Often, production of transparent conductors requires balancing trade-offs between the electrical and optical performances. As a general rule for nanostructure-based transparent conductors, higher transmission and lower haze are typically associated with fewer conductive nanostructures, which in turn results in a higher sheet resistance (i.e., less conductive).

Many commercial applications for transparent conductors (e.g., touch-panels and displays) require the haze level be maintained below 2%. Productions of low-haze transparent conductors are thus particularly challenging because, in achieving such low level of haze, satisfactory conductivity can be impossible to maintain.

BRIEF SUMMARY

Described herein are low-haze transparent conductors having a haze of less than 1.5%, more typically, less than 0.5%, while maintaining high electrical conductivities (e.g., less than 350 ohms/square), and methods of making the same.

One embodiment provides a transparent conductor comprising a plurality of conductive nanostructures, wherein the transparent conductor has a haze of less than 1.5%, and a sheet resistance of less than 350 ohms/square.

A further embodiment provides a transparent conductor wherein the sheet resistance is less than 50 ohms/square.

A further embodiment provides a transparent conductor wherein the haze is less than 0.5%.

Another embodiment provides a transparent conductor comprising a plurality of conductive nanostructures, wherein the transparent conductor has a haze is about 0.3-0.4% and a sheet resistance is about 170-350 ohms/square.

Another embodiment provides a transparent conductor comprising a plurality of conductive nanostructures, wherein the transparent conductor has a haze is about 0.4-0.5% and a sheet resistance is about 120-170 ohms/square.

Another embodiment provides a transparent conductor comprising a plurality of conductive nanostructures, wherein the transparent conductor has a haze is about 0.5-0.7% and a sheet resistance is about 80-120 ohms/square.

Another embodiment provides a transparent conductor comprising a plurality of conductive nanostructures, wherein the transparent conductor has a haze is about 0.7-1.0% and a sheet resistance is about 50-80 ohms/square.

Another embodiment provides a transparent conductor comprising a plurality of conductive nanostructures, wherein the transparent conductor has a haze is about 1.0-1.5% and a sheet resistance is about 30-50 ohms/square.

Further embodiments provide transparent conductors having the above film specifications, wherein more than 99% of the conductive nanostructures with aspect ratios of at least 10 are no more than 55 µm long, or wherein more than 99% of the conductive nanostructures with aspect ratios of at least 10 are no more than 45 µm long, or wherein more than 95% of the conductive nanostructures with aspect ratios of at least 10 are about 5 to 50 µm long, or wherein more than 95% of the conductive nanostructures with aspect ratios of at least 10 are about 5 to 30 µm long, or wherein the conductive nanostructures with aspect ratios of at least 10 have a mean length of about 10-22 µm, or wherein the conductive nanostructures with aspect ratios of at least 10 have a mean length squared of about 120-400 µm$^2$.

Further embodiments provide transparent conductors having the above film specifications, wherein more than 99% of the conductive nanostructures with aspect ratios of at least 10 are no more than 55 nm in diameter; or wherein more than 99% of the conductive nanostructures with aspect ratios of at least 10 are no more than 45 nm in diameter, or wherein more than 95% of the conductive nanostructures with aspect ratios of at least 10 are about 15 to 50 nm in diameter, or wherein more than 95% of the conductive nanostructures with aspect ratios of at least 10 are about 20 to 40 nm in diameter, or wherein the conductive nanostructures with aspect ratios of at least 10 have a mean diameter of about 26-32 nm and a standard deviation in the range of 4-6 nm, or wherein the conductive nanostructures with aspect ratios of at least 10 have a mean diameter of about 29 nm and a standard deviation in the range of 4-5 nm.

Further embodiments provide transparent conductors having the above film specifications, wherein more than 99% of the conductive nanostructures with aspect ratios of at least 10 are no more than 55 µm long, and more than 99% of the conductive nanostructures with aspect ratios of at least 10 are no more than 55 nm in diameter; or wherein more than 95% of the conductive nanostructures with aspect ratios of at least 10 are about 5 to 50 µm long, and more than 95% of the conductive nanostructures with aspect ratios of at least 10 are about 15 to 50 nm in diameter; or wherein more than 95% of the conductive nanostructures with aspect ratios of at least 10 are about 5 to 30 µm long, and more than 95% of the conductive nanostructures with aspect ratios of at least 10 are about 20 to 40 nm in diameter; or wherein the conductive nanostructures with aspect ratios of at least 10 have a mean length of about 10-22 µm, and wherein the conductive nanostructures with aspect ratios of at least 10 have a mean diameter of about 26-32 nm and a standard deviation in the range of 4-6 nm; or wherein more than 99% of the conductive nanostructures with aspect ratios of at least 10 are no more than 45 µm long, and more than 99% of the conductive nanostructures with aspect ratios of at least 10 are no more than 45 nm in diameter.

A further embodiment provides a method comprising: growing metal nanowires from a reaction solution including a metal salt and a reducing agent, wherein the growing includes:

reacting a first portion of the metal salt and the reducing agent in the reaction solution for a first period of time, and gradually adding a second portion of the metal salt over a second period of time while maintaining a substantially constant concentration of less than 0.1% w/w of the metal salt in the reaction solution.

A further embodiment provides an ink composition comprising a plurality of conductive nanostructures, wherein more than 99% of the conductive nanostructures with aspect ratios of at least 10 are no more than 55 µm long, a viscosity modifier, a surfactant; and a dispersing fluid.

Additional embodiments provide ink compositions wherein more than 99% of the conductive nanostructures with aspect ratios of at least 10 are no more than 45 µm long; or wherein more than 95% of the conductive nanostructures with aspect ratios of at least 10 are about 5 to 50 µm long; or wherein more than 95% of the conductive nanostructures with aspect ratios of at least 10 are about 5 to 30 µm long; or wherein the conductive nanostructures with aspect ratios of at least 10 have a mean length of about 10-22 µm; or wherein the conductive nanostructures with aspect ratios of at least 10 have a mean length squared of about 120-400 µm².

A further embodiment provides an ink composition comprising a plurality of conductive nanostructures, wherein more than 99% of the conductive nanostructures with aspect ratios of at least 10 are no more than 55 nm in diameter; a viscosity modifier; a surfactant; and a dispersing fluid.

Additional embodiments provide ink compositions wherein more than 99% of the conductive nanostructures with aspect ratios of at least 10 are no more than 45 nm in diameter; wherein more than 95% of the conductive nanostructures with aspect ratios of at least 10 are about 15 to 50 nm in diameter; wherein more than 95% of the conductive nanostructures with aspect ratios of at least 10 are about 20 to 40 nm in diameter; wherein the conductive nanostructures with aspect ratios of at least 10 have a mean diameter of about 26-32 nm and a standard deviation in the range of 4-6 nm; wherein the conductive nanostructures with aspect ratios of at least 10 have a mean diameter of about 29 nm and a standard deviation in the range of 4-5 nm.

A further embodiment provides an ink composition comprising a plurality of conductive nanostructures, composition comprising: a plurality of conductive nanostructures; a viscosity modifier; a surfactant; and a dispersing fluid, wherein more than 99% of the conductive nanostructures with aspect ratios of at least 10 are no more than 55 µm long, and more than 99% of the conductive nanostructures with aspect ratios of at least 10 are no more than 55 nm in diameter.

Additional embodiments provide ink compositions, wherein more than 95% of the conductive nanostructures with aspect ratios of at least 10 are about 5 to 50 µm long, and more than 95% of the conductive nanostructures with aspect ratios of at least 10 are about 15 to 50 nm in diameter; or wherein more than 95% of the conductive nanostructures with aspect ratios of at least 10 are about 5 to 30 µm long, and more than 95% of the conductive nanostructures with aspect ratios of at least 10 are about 20 to 40 nm long; or wherein the conductive nanostructures with aspect ratios of at least 10 have a mean length of about 10-22 µm, and wherein the conductive nanostructures with aspect ratios of at least 10 have a mean diameter of about 26-32 nm and a standard deviation in the range of 4-6 nm; or wherein more than 99% of the conductive nanostructures with aspect ratios of at least 10 are no more than 45 µm long, and more than 99% of the conductive nanostructures with aspect ratios of at least 10 are no more than 45 nm in diameter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been selected solely for ease of recognition in the drawings.

DETAILED DESCRIPTION OF THE INVENTION

Generally speaking, the transparent conductors described herein are thin conductive films of conductive nanostructures. In the transparent conductor, one or more electrically conductive paths are established through continuous physical contacts among the nanostructures. A conductive network of nanostructures is formed when sufficient nanostructures are present to reach an electrical percolation threshold. The electrical percolation threshold is therefore an important value above which long range connectivity can be achieved.

The electrical conductivity of the conductive film is often measured by "film resistance," "resistivity" or "sheet resistance," which is represented by ohm/square (or "Ω/□"). The film resistance is a function of at least the surface loading density, the size/shapes of the nanostructures, and the intrinsic electrical property of the nanostructure constituents. As used herein, a thin film is considered conductive if it has a sheet resistance of no higher than $10^8 Ω/□$. Preferably, the sheet resistance is no higher than $10^4 Ω/□$, 3,000Ω/□, 1,000Ω/□ or 350Ω/□, or 100Ω/□. Typically, the sheet resistance of a conductive network formed by metal nanostructures is in the ranges of from 10Ω/□ to 1000Ω/□, from 100Ω/□ to 750Ω/□, 50Ω/□ to 200Ω/□, from 100Ω/□ to 500Ω/□, or from 100Ω/□ to 250Ω/□, or 10Ω/□ to 200Ω/□, from 10Ω/□ to 50Ω/□, or from 1Ω/□ to 10Ω/□.

Optically, the nanostructure-based transparent conductors have high light transmission in the visible region (400-700 nm). Typically, the transparent conductor is considered optically clear when the light transmission is more than 85% in the visible region. More typically, the light transmission is more than 90%. or more than 93%, or more than 95%.

Haze is another index of optical clarity. It is generally recognized that haze results from light scattering and reflection/refraction due to both bulk and surface roughness effects. Low-haze transparent conductors are particularly desirable in applications such as touch screens and displays, in which optical clarity is among critical performance factors.

For transparent conductors in which nanostructures form the conductive media, light scattering arising from the nanostructures is inevitable. However, as described herein, low-haze transparent conductors can be obtained by controlling the size distribution profile and particle morphology of the nanostructures.

Generally, the level at which haze can be detected by the human eye is about 2%. Thus, various embodiments of this disclosure are directed to transparent conductors having less than 1.5% in haze.

One embodiment provides a transparent conductor comprising a plurality of conductive nanostructures, wherein the transparent conductor has a haze of less than 1.5%, and a sheet resistance of less than 350 ohms/square.

A further embodiment provides a transparent conductor comprising a plurality of conductive nanostructures, wherein the transparent conductor has a haze of less than 1.5%, and a sheet resistance of less than 50 ohms/square.

Another embodiment provides a transparent conductor comprising a plurality of conductive nanostructures, wherein the transparent conductor has a haze of less than 0.5%, and a sheet resistance of less than 350 ohms/square.

Another embodiment provides a transparent conductor comprising a plurality of conductive nanostructures, wherein the transparent conductor has a haze of less than 0.3%, and a sheet resistance of less than 350 ohms/square.

Another embodiment provides a transparent conductor comprising a plurality of conductive nanostructures, wherein the transparent conductor has a haze is about 0.3-0.4% and a sheet resistance is about 170-350 ohms/square.

Another embodiment provides a transparent conductor comprising a plurality of conductive nanostructures, wherein the transparent conductor has a haze is about 0.4-0.5% and a sheet resistance is about 120-170 ohms/square.

Another embodiment provides a transparent conductor comprising a plurality of conductive nanostructures, wherein the transparent conductor has a haze is about 0.5-0.7% and a sheet resistance is about 80-120 ohms/square.

Another embodiment provides a transparent conductor comprising a plurality of conductive nanostructures, wherein the transparent conductor has a haze is about 0.7-1.0% and a sheet resistance is about 50-80 ohms/square.

Another embodiment provides a transparent conductor comprising a plurality of conductive nanostructures, wherein the transparent conductor has a haze is about 1.0-1.5% and a sheet resistance is about 30-50 ohms/square.

Nanostructure Size Distribution Profile

In order to meet the above thin film specifications, including transmission, sheet resistance and haze, the transparent conductor comprises nanostructures that conform to certain size distribution profiles.

As used herein, "conductive nanostructures" or "nanostructures" generally refer to electrically conductive nano-sized structures, at least one dimension of which (i.e., width) is less than 500 nm, more typically, less than 100 nm or 50 nm, even more typically, in the range of 20 to 40 nm. Lengthwise, the nanostructures are more than 500 nm, or more than 1 μm, or more than 10 μM in length. More typically, the nanostructures are in the range of 5 to 30 μM long.

The nanostructures can be of any shape or geometry. One way for defining the geometry of a given nanostructure is by its "aspect ratio," which refers to the ratio of the length and the width (or diameter) of the nanostructure. In certain embodiments, the nanostructures are isotropically shaped (i.e., aspect ratio=1). Typical isotropic or substantially isotropic nanostructures include nanoparticles. In preferred embodiments, the nanostructures are anisotropically shaped (i.e. aspect ratio≠1). The anisotropic nanostructure typically has a longitudinal axis along its length. Exemplary anisotropic nanostructures include nanowires (solid nanostructures having aspect ratio of at least 10, and more typically, at least 50), nanorods (solid nanostructures having aspect ratio of less than 10) and nanotubes (hollow nanostructures).

In addition to the loading density of the nanostructures, their sizes and shapes are among factors that determine the film specifications. More specifically, the length, width and aspect ratio of the nanostructures, often to different degrees, affect the final sheet resistance (R), transmission (T) and haze (H). For instance, the lengths of the nanostructures typically control the extent of the interconnectivity of the nanostructures, which in turn affect the sheet resistance of the transparent conductor. The widths of the nanostructures do not typically affect the interconnectivity of the nanostructure; however, they can significantly impact the haze of the transparent conductor.

Realistically, rather than having a uniform size, a given population of nanostructures (e.g., the product following synthesis and purification) includes nanostructures in a range of sizes (length and width). Accordingly, the specifications (R, T and H) of a thin film formed by such a population of nanostructures depend on the collective contribution of nanostructures across a size distribution profile.

A size distribution profile comprises a set of values that define the relative amounts or frequencies of nanostructures present, sorted according to their respective sizes (length and width).

The size distribution profile can be graphically represented by a histogram, which is created by sorting a given population of nanostructures according to non-overlapping, regular intervals of certain size range and plotting the frequencies of nanostructures that fall within each interval. The regular interval of the size range is also referred to as "bin range."

Figure 1:
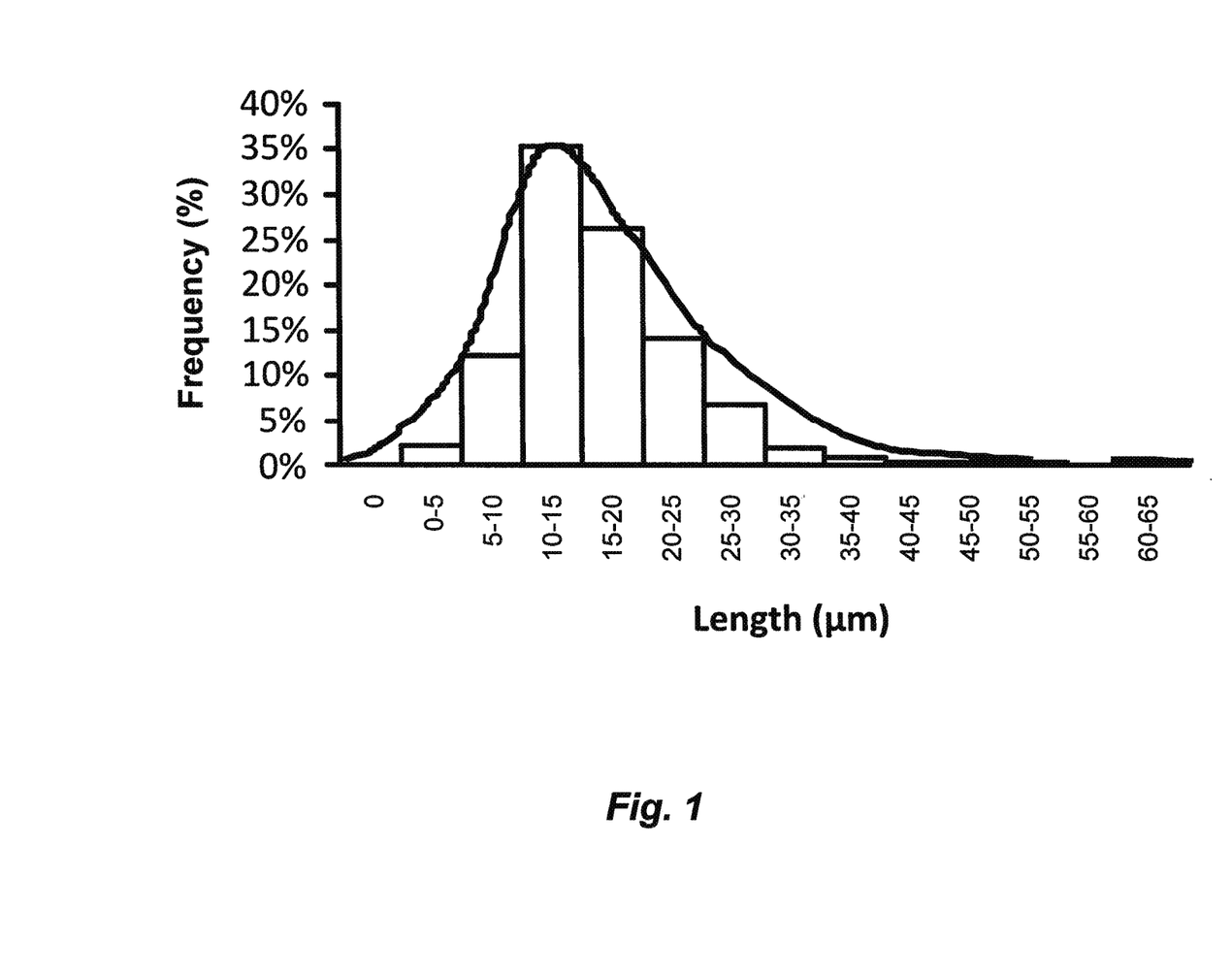
FIG. 1 is a histogram displaying the distribution profile of a population of nanowires according to their lengths.

FIG. 1 is a histogram displaying the distribution profile of a population of nanostructures (e.g., nanowires) according to their lengths, with the bin ranges (5 μm intervals) on the X axis and the frequencies as columns along the Y axis. Given the lengths and corresponding frequency data, a smooth curve can also be constructed based on a probability density function. FIG. 1 thus quantitatively and graphically shows the shape (a log normal distribution) and spread (variations around the mean) of the length distribution in said population of nanostructures.

Moreover, FIG. 1 shows the maximum and minimum lengths of the range of the lengths. It can be observed that certain nanostructures that contribute to light scattering without contributing to conductivity are present at much lower frequencies (e.g., less than 10%, or more typically, less than 5%) in the size distribution profile. These nanostructures are seen as "bright objects" due to their appearance on dark field micrographs. These bright objects include, for example, nanostructures that are too wide and/or too short (e.g., nanoparticles, nanorods) to effectively participate in the electrical percolation process. Some or all of these bright objects have low aspect ratios (less than 10).

Thus, one embodiment provides a low-haze transparent conductor comprising a plurality of conductive nanostructures and having a haze of less than 1.5%, and sheet resistance of less than 350 ohms/square, wherein more than 99% of the conductive nanostructures with aspect ratios of at least 10 are no more than 55 µm long.

A further embodiment provides a low-haze transparent conductor comprising a plurality of conductive nanostructures and having a haze of less than 1.5%, wherein more than 99% of the conductive nanostructures with aspect ratios of at least 10 are no more than 45 µm long.

A further embodiment provides a transparent conductor comprising a plurality of conductive nanostructures having a haze of less than 1.5%, wherein more than 95% of the conductive nanostructures with aspect ratios of at least 10 are about 5 to 50 µm long.

A further embodiment provides a transparent conductor comprising a plurality of conductive nanostructures having a haze of less than 1.5%, wherein more than 95% of the conductive nanostructures with aspect ratios of at least 10 are about 5 to 30 µm long.

In addition to the length distribution, mean length ($<l>$) and mean length squared ($<l^2>$) of the nanostructures are also indicative of the film specifications. In particular, the mean length squared ($<l^2>$) of the nanostructures determine the percolation threshold, and is thus directly related to the sheet resistance. Co-owned and co-pending U.S. application Ser. No. 11/871,053 provides more detailed analysis of the correlation between these two parameters with sheet resistance in nanowire-based transparent conductors, which application is incorporated herein by reference in its entirety.

As used herein, mean length ($<l>$) is the sum of all the measured lengths divided by the counted number of the nanostructures, as described herein.

Mean length squared ($<l^2>$) can be represented by:

$$<l^2> = \frac{\sum_{i=1}^{n} l_i^2}{n}$$

Thus, a further embodiment provides a transparent conductor comprising a plurality of conductive nanostructures having a haze of less than 1.5%, wherein the conductive nanostructures with aspect ratios of at least 10 have a mean length of about 10-22 µm.

In various further embodiments, the conductive nanostructures with aspect ratios of at least 10 have a mean length of about 12-20 µm, 14-18 µm or 15-17 µm.

Another embodiment provides a transparent conductor comprising a plurality of conductive nanostructures having a haze of less than 1.5%, wherein the conductive nanostructures with aspect ratios of at least 10 have a mean length squared of about 120-600 µm².

In various further embodiments, the conductive nanowires with aspect ratio of at least 10 have a mean length squared of about 240-400 µm² or 260-350 µm².

Figure 2:
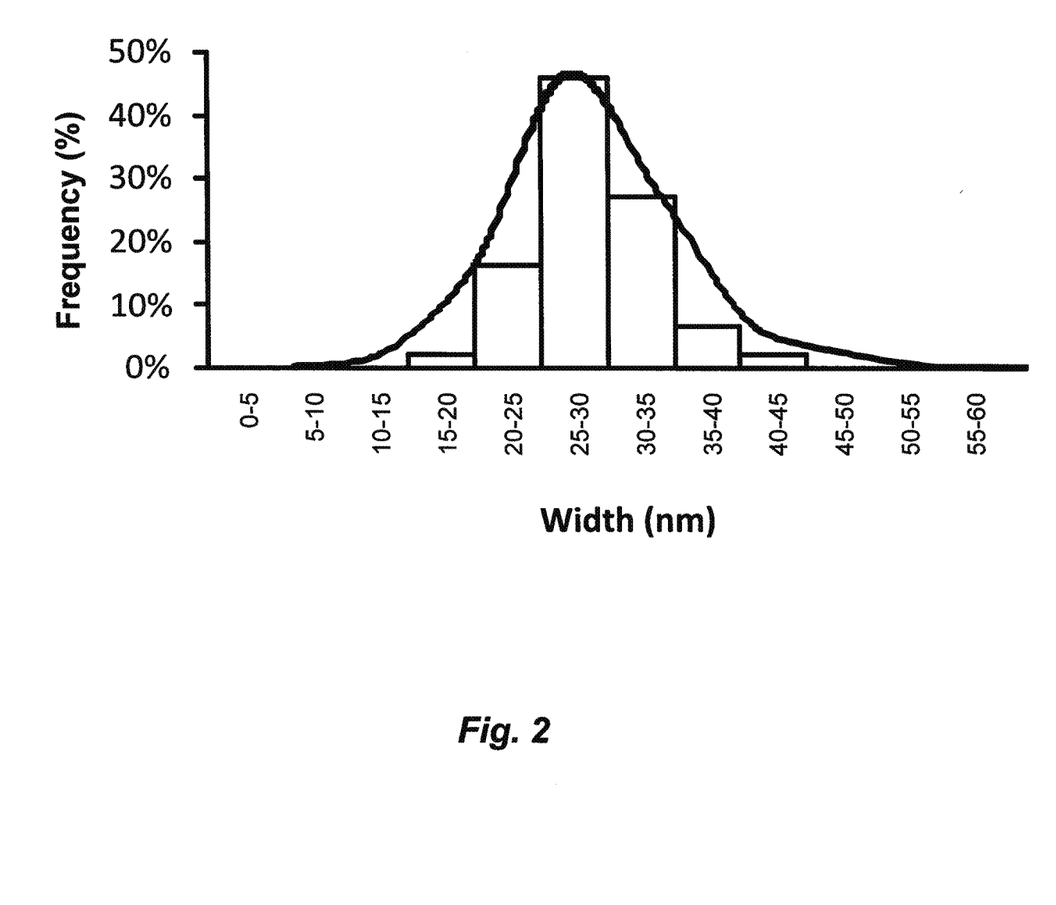
FIG. 2 is a histogram displaying the distribution profile of a population of nanowires according to their diameters.

FIG. 2 is a histogram displaying the distribution profile of a population of nanostructures (e.g., nanowires) according to their diameters, with the bin ranges (5 nm intervals) on the X axis and the frequencies as columns along the Y axis. Given the diameters and corresponding frequency data, a smooth curve can also be constructed based on a probability density function. FIG. 2 thus quantitatively and graphically shows the shape (a normal or Gaussian distribution) and spread (variation around the mean) of the diameter distribution in said population of nanostructures.

As a result of the normal distribution, the distribution profile of the plurality of nanostructures can be defined by the mean and standard deviation of the diameters.

FIG. 2 shows a narrow distribution (i.e., relatively small standard deviation) of the diameters of the nanostructures. As used herein, a normal distribution is considered narrow when the standard deviation is less than 20% of the mean, or more typically less than 15% of the mean. It is believed that a narrow diameter distribution reduces the compositional heterogeneity of the nanostructures of the film, resulting in a lowered haze.

Thus, one embodiment provides a transparent conductor comprising a plurality of conductive nanostructures having a haze of less than 1.5%, wherein more than 99% of the conductive nanostructures with aspect ratios of at least 10 are no more than 55 nm in diameter.

A further embodiment provides a transparent conductor comprising a plurality of conductive nanostructures having a haze of less than 1.5%, wherein more than 99% of the conductive nanostructures with aspect ratios of at least 10 are no more than 45 nm in diameter.

A further embodiment provides a transparent conductor comprising a plurality of conductive nanostructures having a haze of less than 1.5%, wherein more than 95% of the conductive nanostructures with aspect ratios of at least 10 are about 15 to 50 nm in diameter.

A further embodiment provides a transparent conductor comprising a plurality of conductive nanostructures having a haze of less than 1.5%, wherein more than 95% of the conductive nanostructures with aspect ratios of at least 10 are about 20 to 40 nm in diameter.

A further embodiment provides a transparent conductor comprising a plurality of conductive nanostructures having a haze of less than 1.5%, wherein the conductive nanostructures with aspect ratios of at least 10 have a mean diameter of about 26-32 nm and a standard deviation in the range of 4-6 nm.

A further embodiment provides a transparent conductor comprising a plurality of conductive nanostructures having a haze of less than 1.5%, wherein the conductive nanostructures with aspect ratios of at least 10 have a mean diameter of about 29 nm and a standard deviation in the range of 4-5 nm.

A further embodiment provides a low-haze transparent conductor comprising a plurality of conductive nanostructures and having a haze of less than 1.5%, wherein more than 99% of the conductive nanostructures with aspect ratios of at least 10 are no more than 55 µm long, and more than 99% of the conductive nanostructures with aspect ratios of at least 10 are no more than 55 nm in diameter.

A further embodiment provides a low-haze transparent conductor comprising a plurality of conductive nanostructures and having a haze of less than 1.5%, wherein more than 99% of the conductive nanostructures with aspect ratios of at least 10 are no more than 45 µm long, and more than 99% of the conductive nanostructures with aspect ratios of at least 10 are no more than 45 nm in diameter.

A further embodiment provides a low-haze transparent conductor comprising a plurality of conductive nanostructures and having a haze of less than 1.5%, wherein more than 95% of the conductive nanostructures with aspect ratios of at least 10 are about 5 to 50 µm long, and more than 95% of the conductive nanostructures with aspect ratios of at least 10 are about 15 to 50 nm in diameter.

A further embodiment provides a low-haze transparent conductor comprising a plurality of conductive nanostructures and having a haze of less than 1.5%, wherein more than 95% of the conductive nanostructures with aspect ratios of at least 10 are about 5 to 30 µm long, and more than 95% of the conductive nanostructures with aspect ratios of at least 10 are about 20 to 40 nm long.

A further embodiment provides a low-haze transparent conductor comprising a plurality of conductive nanostructures and having a haze of less than 1.5%, wherein the conductive nanostructures with aspect ratios of at least 10 have a mean length of about 10-22 µm, and wherein the conductive nanostructures with aspect ratios of at least 10 have a mean diameter of about 26-32 nm and a standard deviation in the range of 4-6 nm.

Additional embodiments provide that any of the low-haze transparent conductors described above have a haze of less than 1.0%, less than 0.8%, or less than 0.6%, or less than 0.5%, or less than 0.4%, or less than 0.3%.

Additional embodiments provide that in any of the low-haze transparent conductors described above, the conductive nanostructures with aspect ratios of at least 10 are nanowires, including without limitation, metal nanowires (e.g., silver nanowires), and metal nanotubes (e.g., silver or gold nanotubes).

Preparation of Nanostructures

The nanostructures (e.g., metallic nanowires) that conform to the size distribution profiles described herein can be prepared by chemical synthesis.

Conventionally, metallic nanowires can be nucleated and grown out of a solution of the corresponding metallic salt in the presence of an excessive amount of reducing agent, which also serves as a solvent (e.g., ethylene glycol or propylene glycol). In this type of solution phase reaction, the nanowire growth typically progresses simultaneously in the radial and axial directions. Accordingly, as the nanowires elongate, the diameters also enlarge. See, e.g., Y. Sun, B. Gates, B. Mayers, & Y. Xia, "Crystalline silver nanowires by soft solution processing", *Nanolett*, (2002), 2(2): 165-168.

For low-haze transparent conductors described herein, the nanowires can have relatively small diameters (e.g., mean diameters of 15-50 nm) and a narrow width distribution. At these diameter ranges, conventional synthesis would have produced much shorter nanowires than the length distribution (including mean length) that provides a satisfactory conductivity (e.g., less than 350 ohm/square). Conversely, if the nanowires are allowed to grow to the requisite length to attain the satisfactory conductivity, the diameters of the nanowires are inevitably large enough to raise the haze value (e.g., above 1.5%).

To provide a population of nanowires that conform to the size distribution profiles and thus form low haze transparent conductive films, a two-phase synthesis is described.

Figure 3:
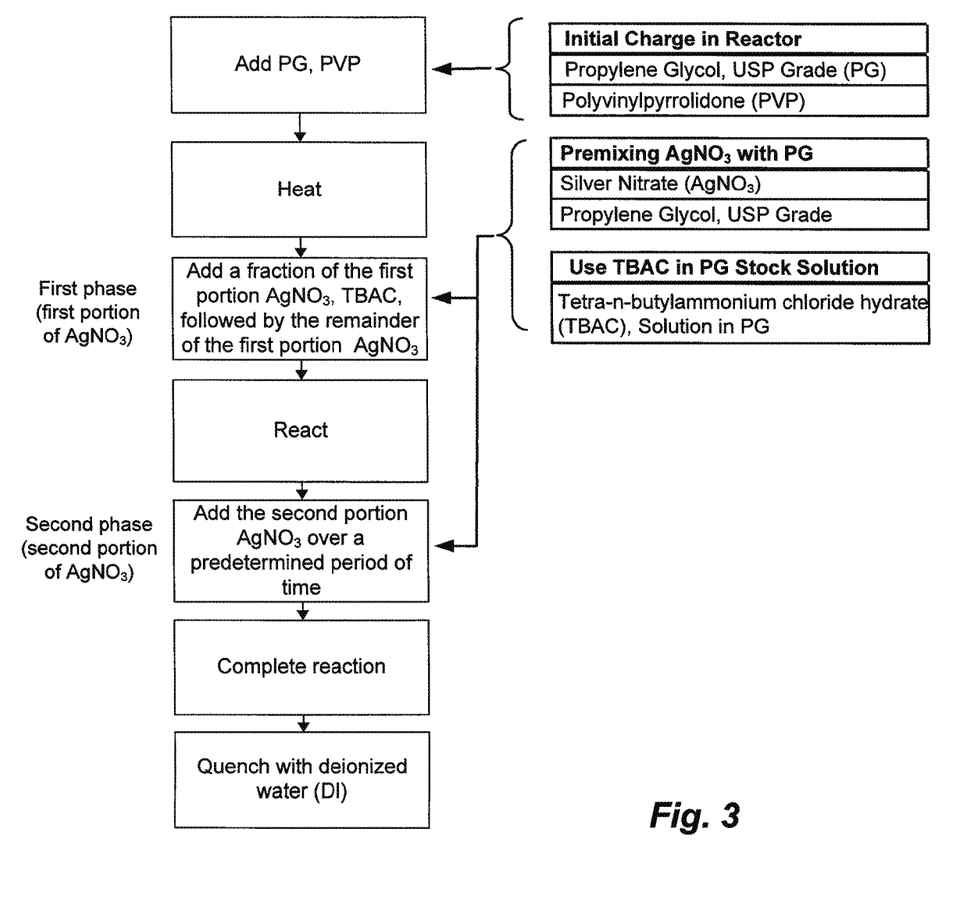
FIG. 3 is a flow chart of a two-phase reaction scheme for preparing silver nanowires that conform to certain size distribution profiles.

The two-phase synthesis separately promotes radial and axial growth of the nanowires, such that the diameter and length of the nanowires can be separately controlled. FIG. 3 is a flow chart showing the two-phase preparation of silver nanowires, which are nucleated and grown from a propylene glycol solution of silver nitrate. Additional components of the reaction include polyvinylpyrrolidone and tetra-n-butylammonium chloride (TBAC). By controlling the amount and sequence of adding silver nitrate, the growth and the final size of the nanowires can be controlled.

The silver nitrate solution contains a pre-determined total amount of silver nitrate, which is split into two portions to be added at two different phases of the reaction. The split can be in the ranges of 30-70: 70-30, and preferably at 50:50.

In the first phase of the reaction, a first portion of the total silver nitrate is used. Further, a fraction of the first portion of silver nitrate is introduced with TBAC, such that the concentration of the initial silver ions in the reaction mixture is about 0.001 to 0.025%. Thereafter, the remainder of the first portion of the silver nitrate is added. The first phase of the reaction typically is allowed to run for 12-16 hours. During this phase, nanowires are formed as they grow in both radial and axial directions. At the end of the first phase, the lengths of the nanowires are shorter than the final desired lengths; however, the diameters of the nanowires are substantially close to their final dimensions.

In the second phase of the reaction, the second portion of the silver nitrate is gradually added over a period in which the concentration of the silver ions in the reaction solution is maintained substantially constant and below 0.1% w/w. During the second phase, the predominant wire growth is in the axial direction, while the radial growth is effectively slowed or even stopped.

The total reaction time of the two phases is about 24 hours. The reaction can be quenched with de-ionized (DI) water, at which point growth in all directions is arrested.

Throughout the reaction, the reaction mixture is preferably kept in an inert atmosphere. The inert gas may be a noble gas (e.g. helium, neon, argon, krypton or xenon) or other inert gas such as nitrogen or an inert gas mixture or compound gas. Typically, the reaction vessel is initially purged with an inert gas for a predetermined period of time. The purging is maintained throughout the reaction. More detailed description regarding purging can be found in co-owned U.S. Application No. 61/275,093, which application is incorporated herein by reference in its entirety.

Thus, one embodiment provides a method comprising: growing metal nanowires from a reaction solution including a metal salt and a reducing agent, wherein the growing includes:

reacting a first portion of the metal salt with the reducing agent in the reaction solution for a first period of time, and gradually adding the second portion of the metal salt over a second period of time while maintaining a substantially constant concentration of less than 0.1% w/w of the metal salt in the reaction solution.

Further embodiments provide that the metal nanowires are silver nanowires, the metal salt is silver nitrate, and the reducing agent is propylene glycol or ethylene glycol.

A further embodiment provides that the first and second portions of the metal salt are about equal amount.

Another embodiment provides that during the first period of time, a fraction of the first portion of the metal salt is first added with an ammonium salt (TBAC), followed by the remainder of the first portion of the metal salt. In some embodiments, the fraction represents about 0.6% of the total metal salt, and about 0.001 to 0.025% w/w of the metal ions in the reaction mixture.

It should be understood that although nanowires (e.g., silver nanowires) are described in connection with the above two-phase synthesis, nanowires of other conductive material can be prepared in a similar manner. Other metallic material can be an elemental metal (e.g., transition metals) or a metal compound (e.g., metal oxide). The metallic material can also be a bimetallic material or a metal alloy, which comprises two or more types of metal. Suitable metals include, but are not limited to, silver, gold, copper, nickel, gold-plated silver, platinum and palladium.

Thin Film Preparation

In various embodiments, the transparent conductors described herein are thin films cast from dispersions of nanostructures, also referred to as "ink compositions."

A typical ink composition for depositing metal nanowires comprises, by weight, from 0.0025% to 0.1% surfactant (e.g., a preferred range is from 0.0025% to 0.05% for Zonyl® FSO-100 or 0.005% to 0.025% Triton X-100), from 0.02% to 4% viscosity modifier (e.g., a preferred range is 0.02% to 0.5% for hydroxypropylmethylcellulose (HPMC), from 0.01 to 1.5% metal nanowires, and from 94.5% to 99.0% fluid (for dispersing or suspending the other constituents).

In various embodiments, ink compositions of silver nanowires include 0.1% to 0.2% silver nanowires, 0.2 to 0.4% high purity HPMC, and 0.005% to 0.025% Triton X-100. Methods of purifying HPMC are described in co-owned U.S. Application No. 61/175,745, which application is incorporated herein by reference in its entirety.

Representative examples of suitable surfactants include fluorosurfactants such as ZONYL®surfactants, including ZONYL® FSN, ZONYL® FSO, ZONYL® FSA, ZONYL® FSH (DuPont Chemicals, Wilmington, Del.), and NOVEC™ (3M, St. Paul, Minn.). Other exemplary surfactants include non-ionic surfactants based on alkylphenol ethoxylates. Preferred surfactants include, for example, octylphenol ethoxylates such as TRITON™ (x100, x114, x45), and nonylphenol ethoxylates such as TERGITOL™ (Dow Chemical Company, Midland Mich.). Further exemplary non-ionic surfactants include acetylenic-based surfactants such as DYNOL® (604, 607) (Air Products and Chemicals, Inc., Allentown, Pa.) and n-dodecyl β-D-maltoside.

Examples of suitable viscosity modifiers include hydroxypropyl methyl cellulose (HPMC), methyl cellulose, xanthan gum, polyvinyl alcohol, carboxy methyl cellulose, hydroxy ethyl cellulose. Examples of suitable fluids include water and isopropanol.

Thus, one embodiment provides an ink composition comprising a plurality of conductive nanostructures, wherein more than 99% of the conductive nanostructures are no more than 55 μm long.

A further embodiment provides an ink composition comprising a plurality of conductive nanostructures, wherein more than 99% of the conductive nanostructures are no more than 45 μm long.

A further embodiment an ink composition comprising a plurality of conductive nanostructures, wherein more than 95% of the conductive nanostructures are about 5 to 50 μm long.

A further embodiment provides an ink composition comprising a plurality of conductive nanostructures, wherein more than 95% of the conductive nanostructures with aspect ratios of at least 10 are about 5 to 30 μm long.

a further embodiment provides an ink composition comprising a plurality of conductive nanostructures, wherein the conductive nanostructures with aspect ratios of at least 10 have a mean length of about 10-22 μm.

Another embodiment provides an ink composition comprising a plurality of conductive nanostructures, wherein the conductive nanostructures with aspect ratios of at least 10 have a mean length squared of about 120-400 μm$^2$.

Another embodiment provides an ink composition comprising a plurality of conductive nanostructures, wherein more than 99% of the conductive nanostructures with aspect ratios of at least 10 are no more than 55 nm in diameter.

A further embodiment provides an ink composition comprising a plurality of conductive nanostructures, wherein more than 99% of the conductive nanostructures with aspect ratios of at least 10 are no more than 45 nm in diameter.

A further embodiment provides an ink composition comprising a plurality of conductive nanostructures, wherein more than 95% of the conductive nanostructures with aspect ratios of at least 10 are about 15 to 50 nm in diameter.

A further embodiment provides an ink composition comprising a plurality of conductive nanostructures, wherein more than 95% of the conductive nanostructures with aspect ratios of at least 10 are about 20 to 40 nm in diameter.

A further embodiment provides an ink composition comprising a plurality of conductive nanostructures, wherein the conductive nanostructures with aspect ratios of at least 10 have a mean diameter of about 26-32 nm and a standard deviation in the range of 4-6 nm.

A further embodiment provides an ink composition comprising a plurality of conductive nanostructures, wherein the conductive nanostructures with aspect ratios of at least 10 have a mean diameter of about 29 nm and a standard deviation in the range of 4-5 nm.

A further embodiment provides an ink composition comprising a plurality of conductive nanostructures, wherein more than 99% of the conductive nanostructures with aspect ratios of at least 10 are no more than 55 μm long, and more than 99% of the conductive nanostructures with aspect ratios of at least 10 are no more than 55 nm in diameter.

A further embodiment provides an ink composition comprising a plurality of conductive nanostructures, wherein more than 99% of the conductive nanostructures with aspect ratios of at least 10 are no more than 45 μm long, and more than 99% of the conductive nanostructures with aspect ratios of at least 10 are no more than 45 nm in diameter.

A further embodiment provides an ink composition comprising a plurality of conductive nanostructures, wherein more than 95% of the conductive nanostructures with aspect ratios of at least 10 are about 5 to 50 μm long, and more than 95% of the conductive nanostructures with aspect ratios of at least 10 are about 15 to 50 nm in diameter.

A further embodiment provides an ink composition comprising a plurality of conductive nanostructures, wherein more than 95% of the conductive nanostructures with aspect ratios of at least 10 are about 5 to 30 μm long, and more than 95% of the conductive nanostructures with aspect ratios of at least 10 are about 20 to 40 nm long.

A further embodiment provides an ink composition comprising a plurality of conductive nanostructures, wherein the conductive nanostructures with aspect ratios of at least 10 have a mean length of about 10-22 μm, and wherein the conductive nanostructures with aspect ratios of at least 10 have a mean diameter of about 26-32 nm and a standard deviation in the range of 4-6 nm.

Further embodiments provide that in each of the above embodiments, the nanostructures are metal nanowires (e.g., silver nanowires).

The ink composition can be prepared based on a desired concentration of the total nanostructures (e.g., nanowires), which is an index of the loading density of the final conductive film formed on the substrate.

The substrate can be any material onto which nanowires are deposited. The substrate can be rigid or flexible. Preferably, the substrate is also optically clear, i.e., light transmission of the material is at least 80% in the visible region (400 nm-700 nm).

Examples of rigid substrates include glass, polycarbonates, acrylics, and the like. In particular, specialty glass such as alkali-free glass (e.g., borosilicate), low alkali glass, and zero-expansion glass-ceramic can be used. The specialty glass is particularly suited for thin panel display systems, including Liquid Crystal Display (LCD).

Examples of flexible substrates include, but are not limited to: polyesters (e.g., polyethylene terephthalate (PET), polyester naphthalate, and polycarbonate), polyolefins (e.g., linear, branched, and cyclic polyolefins), polyvinyls (e.g., polyvinyl chloride, polyvinylidene chloride, polyvinyl acetals, polystyrene, polyacrylates, and the like), cellulose ester bases (e.g., cellulose triacetate, cellulose acetate), polysulphones such as polyethersulphone, polyimides, silicones and other conventional polymeric films.

The ink composition can be deposited on the substrate according to, for example, the methods described in co-pending U.S. patent application Ser. No. 11/504,822.

Spin coating is a typical technique for depositing a uniform film on a substrate. By controlling the loading amount, spin speed and time, thin films of various thicknesses can be formed. It is understood that the viscosity, the shear behavior of the suspending fluid as well as the interactions between the nanowires, may affect the distribution and interconnectivity of the nanowires deposited.

For example, the ink compositions described herein can be spin-coated on a glass substrate at a speed of 400-2000 rpm for 60 seconds, with acceleration 1000 rpm/s. The thin film can be further subjected to certain post-treatments, including baking at 50° C. for 90 seconds and 140° C. for 90 seconds. Pressure treatment with or without heat can be further employed to adjust the final film specifications.

As understood by one skilled in the art, other deposition techniques can be employed, e.g., sedimentation flow metered by a narrow channel, die flow, flow on an incline, slit coating, gravure coating, microgravure coating, bead coating, dip coating, slot die coating, and the like. Printing techniques can also be used to directly print an ink composition onto a substrate with or without a pattern. For example, inkjet, flexoprinting and screen printing can be employed.

Nanowires Size Measurement

The lengths and widths of the nanostructures (e.g., nanowires) as well as their numbers can be measured and counted through a combination of microscopy and software-assisted image analysis (e.g., available from Clemex Technologies Inc, Quebec, Canada). Regardless of the techniques used for measurements and counting, the microscope system, including optics, camera, and image analysis software, are to be verified and/or calibrated at regular intervals using an National Institute Standards and Technology (NIST) traceable standard.

An optical microscope (e.g., Olympus BX51) equipped with a high resolution digital camera, Clemex stage, and Clemex Analysis software may be used to measure the magnified images of the nanowires.

The lighting on the microscope should be adjusted such that each nanostructure is clearly illuminated to emphasize the nanostructure contrast relative to the background, such that that the image analysis software can accurately recognize and measure the nanostructures. For instance, the microscope may be set to dark field and focuses the image on the monitor at 500× magnification. Each frame on the monitor may be set to represent an area of 258 µm×193 µm on the film.

The wire density should be such that the majority of wires are isolated from each other and not overlapping. Overlapping can be managed or minimized when there are no more than 25 (or more typically no more than 40) wires per frame. To reduce incidences of overlapping wires, the initial dilute dispersion of nanowires can be diluted further. If the wires are too sparse (less than 5 per frame), then nanowire concentration in the starting nanowire dispersion should be increased. Nanowires that touch or are truncated by the edge of the image are automatically eliminated from the measurement using the image analysis software. In addition, bright objects, e.g., nanostructures having aspect ratio of less than 10, are excluded from the measurements and counting.

For instance, to measure the lengths of a population of nanowires, an initial dilute dispersion of metal nanowires in isopropanol (about 0.001 wt % metal) can be spin-coated on a 2" by 2" clean piece of glass at 1000 rpm for 30 seconds. The film is dried thereafter.

The lengths of the nanowires may be measured by initiating a special routine or program using Clemex software:

Prolog
001 Edit Analysis Properties
002 Load Stage Pattern (should be used in Prolog only)
File: length.stg
Path: C:\IaFiles\Pattern
End of Prolog
001 Grab
002 Top Hat on White ×8
Level: White
Size: 8
Reconstruction cycles: 4 Confidential
Test Method
Page 3 of 3
Relative Gray Threshold
BPL1, C1(10.384-207.384), C2(0.000-0.000)
Background: Black Mean
Method: Mean+C1+C2*STD
004 Fill=>BPL1
Fill border objects: No
005 Trap BPL1→None 6×6
006 Square Grid 1×1→BPL8
Overall Grid Dimensions
1392×1040 pixels
258×193 µm
007 Transfer (BPL1 SEL BPL8)→None
008 Object Transfer BPL1→BPL2
Aspect Ratio greater than 3
009 Object Measures (BPL1, 2)→OBJM1
String Length
Aspect Ratio
String Length Squared
010 Clear=>All
Epilog
001 Generate Report (should be used in Epilog only)
Report Template: <<Default Folderlusing:#9>>\test2.xlt Save Report: To "C:\Clemex\Length Analyses\<<Sample>>.xls"
Overwrite Protection Yes
Print Report No
Close Report No
002 Save Analysis Results to LengthData.cxr'
Destination: C:\Clemex\Length Analyses\clemex data files\LengthData.cxr
Overwrite Protection: Yes
Close after Saving: No
End of Epilog Lengths are automatically measured as the program goes through 144 frames. After the measurement is completed, the Clemex software will produce a statistical report containing all the key data (including mean length, standard deviation, mean length squared and binned distribution of lengths). To accept results, the total wire count should be between 800-6000 wires. If the wire count is outside of this range, the test must be repeated with dilution adjustments to the initial nanowire dispersion. As discussed herein, bright objects, e.g., nanostructures having aspect ratio of less than 10, are excluded from the counting.

The widths of the nanowires are measured by Scanning Electron Microscope (SEM).

To prepare a sample, a few drops of a dilute nanowire dispersion in methanol (~0.05 wt % metal) are added on a clean aluminum SEM sample stage. Methanol is allowed to dry and the sample is rinsed several times with additional amounts of methanol to remove any organic residues from the nanowires. The sample is dried before it is inserted into an SEM instrument (e.g., Hitachi S-4700 SEM, verified and/or calibrated at regular intervals using an NIST traceable standard).

The SEM beam acceleration voltage is set to around 10.0 kV. Typically, 8 or more SEM photos at 60K to 80K are taken. Enough photos should be taken for measurement of at least 150 wires (typically 6-10 photos).

For accurate measurement and analysis, the nanowires should be separated from each other in a thin layer and clear of any organic residue. Further, the images should be focused well.

After the SEM images are acquired, the photos are uploaded into the Clemex Image Analysis software, programmed with a special analysis routine:
  001 Edit Analysis Properties
  End of Prolog
  001 Load Image '*.TIF'
  File: *.TIF
  Path: C:\Clemex\SEM width photos
  Use Default Calibration: No
  002 Relative Gray Threshold
  BPL1, C1(0.000-0.488), C2(0.000-0.000)
  Background: White Mean
  Method: C1*Mean+C2
  Pause On Run
  Invert BPL1→BPL2
  004 Pause Edit Line BPL3
  measure wires!!
  005 (BPL2 AND BPL3)→BPL6
  006 Object Transfer BPL6→None
  String Length less than 0.005 μm
  007 Object Measures (BPL6)→OBJM1
  String Length
  Aspect Ratio
  String Length Squared
  008 Clear=>All
  001 Edit Analysis Properties
  End of Field
  001 Generate Report (should be used in Epilog only)
  Report Template: C:\Clemex\templates\width.XLT
  Save Report: To "C:\Clemex\Width Analyses\<<Sample>>.xls"
  Overwrite Protection: Yes
  Print Report: No
  Close Report: No
  002 Save Analysis Results to 'WidthData.cxr'
  Destination: C:\Clemex\Width Analyses\Clemex files\Width Data.cxr
  Overwrite Protection: Yes
  Close after Saving: No
  End of Epilog To measure the widths, the outlines of all the nanowires in an image are first automatically highlighted. A user may manually adjust the relative gray threshold on each image to ensure that the nanowires are accurately highlighted prior to analysis. The user may also select and mark each individual wire to be measured. Clemex software (or other suitable software tools) will then collect all the analyzed data and produce statistical report containing all key data (including mean diameter and standard deviation, and mean diameter squared, and binned distribution of diameters).

The various embodiments described herein are further illustrated by the following non-limiting examples.

EXAMPLES

Example 1

Multi-Phase Synthesis of Silver Nanowires

Silver nanowires that conform to certain size distribution profiles were synthesized in a two-phase process.

A solution of silver nitrate ($AgNO_3$) was first prepared by mixing 6 grams of $AgNO_3$ in 37 grams of propylene glycol (14% w/w).

445 grams of propylene glycol and 7.2 grams of polyvinylpyrrolidone were added to a reaction vessel, which was then heated to 90° C. After the mixture in the reaction vessel has stabilized at 90° C., the atmosphere in the headspace of the reaction vessel is purged with nitrogen for at least 5 minutes before the silver nitrate is added.

In the first phase of the reaction, half of the total silver nitrate was used. Thus, to the heated reactor, 0.6% of the silver nitrate solution and 1.18 grams of tetra-n-butylammonium chloride hydrate in propylene glycol (10% solution) were added sequentially, followed by 49.4% of the silver nitrate solution. The reaction was allowed to run for 12-16 hours.

In the second phase of the reaction, the axial growth was predominant while the radial growth was effectively arrested. The remaining 50% of silver nitrate solution was gradually added while maintaining a substantially constant concentration of silver ions (over a period of 8 hours). The reaction was allowed to run for up to a total of 24 hours, during which time the nitrogen purge was maintained. At the completion of the reaction, the reaction mixture was quenched with 100 grams of deionized (DI) water.

The reaction could be carried out in ambient light (standard) or in the dark to minimize photo-induced degradation of the resulting silver nanowires.

Example 2

Purification of Silver Nanowires

The crude product of Example 1 included crude liquids (e.g., reaction solvents, DI water, reaction by-products), as well as the nanowires formed. A small amount of nanoparticles and nanorods were also present.

The crude product was collected into closed sedimentation containers and allowed to sediment for 4 to 20 days. Following sedimentation, the crude product separated into supernatant and sediment. The sediment contains predominantly silver nanowires, while the crude liquid, nanorods and nanoparticles remained in the supernatant.

The supernatant was removed and the sediment was re-suspended in DI water and rocked on a rocker table to facilitate mixing. For final resuspension, repeated pipetting was used.

Figure 4:
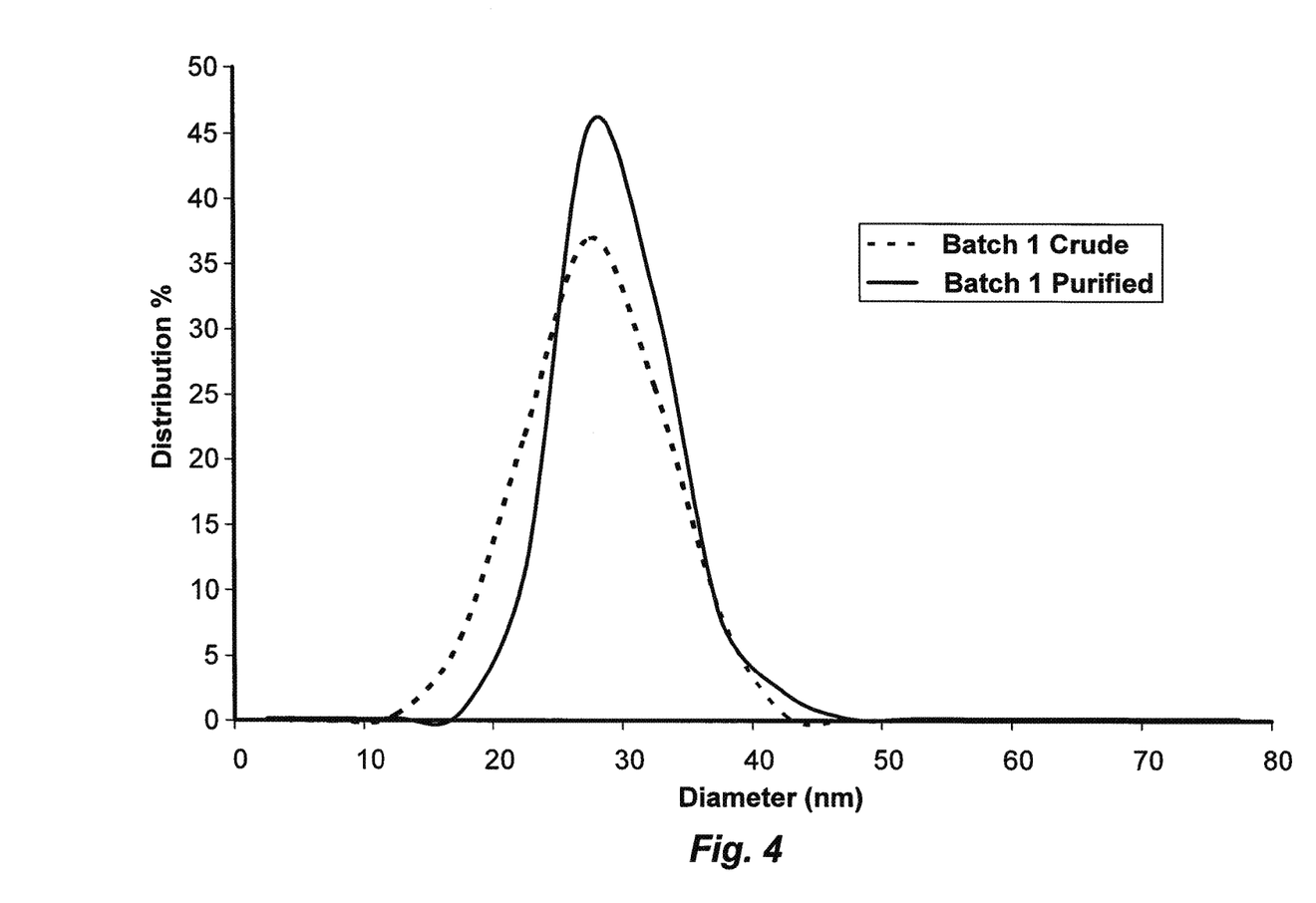
FIG. 4 shows the effect of purification on the diameter distribution of silver nanowires prepared by a two-phase reaction.

FIG. 4 shows the effect of purification on the diameter distribution. Both the crude nanowires and purified nanowires follow a substantially normal distribution. The purification process removed nearly all nanowires of 15 nm or less in diameter. The purified nanowires also have a smaller spread or variations around the mean value of the diameters.

Example 3

Determination of Length Distribution

Three batches of silver nanowires were prepared and purified according to Examples 1 and 2. A sample of nanowires was randomly collected from each batch. The nanowire lengths in each sample were measured and analyzed using an optical microscope and Clemex softwares, as described herein. Table 1 shows the size distributions of nanowires prepared in the three batches.

TABLE 1

| Bin range (μm) | Batch 1 | Batch 2 | Batch 3 |
| --- | --- | --- | --- |
| 0-5 | 7.6% | 2.1% | 4.3% |
| 5-10 | 12.6% | 12.3% | 14.6% |
| 10-15 | 28.8% | 35.5% | 31.2% |
| 15-20 | 26.2% | 26.2% | 25.9% |
| 20-25 | 15.1% | 14.0% | 14.6% |
| 25-30 | 5.7% | 6.7% | 5.9% |
| 30-35 | 2.1% | 2.0% | 2.1% |
| 35-40 | 1.0% | 0.8% | 0.8% |
| 40-45 | 0.5% | 0.2% | 0.2% |
| 45-50 | 0.2% | 0.2% | 0.2% |
| 50-55 | 0.1% | 0.1% | 0.1% |
| 55-60 | 0.0% | 0.0% | 0.1% |
| 60-65 | 0.0% | 0.0% | 0.0% |

Figure 5:
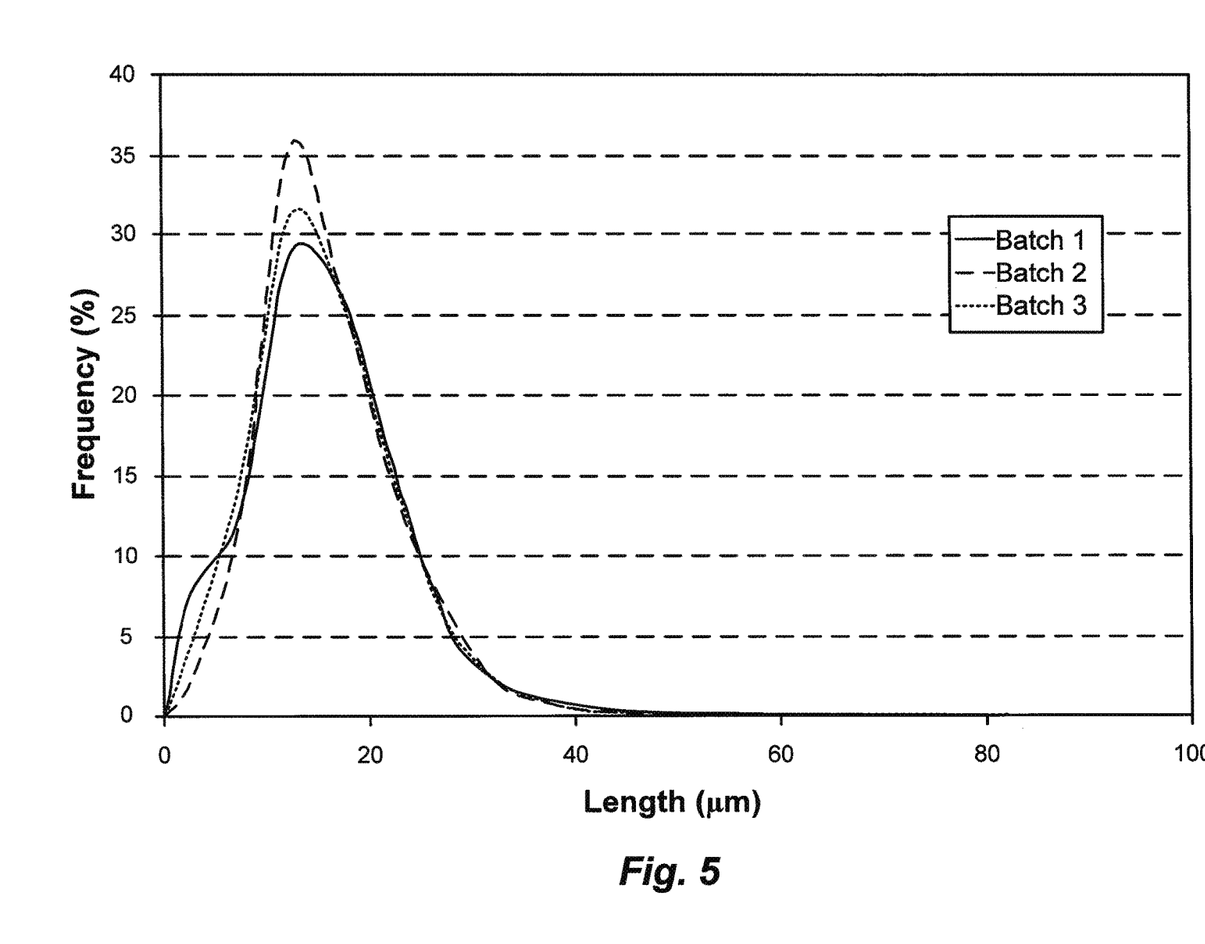
FIG. 5 illustrates the length distribution profiles of three batches of silver nanowires as log normal distributions.

FIG. 5 further illustrates the size distribution profiles of the three batches of silver nanowires as log normal distributions. It is demonstrated that reproducible size distribution profiles were obtained in nanowires prepared according to the synthesis and purification processes described herein.

The statistics of the lengths are summarized in Table 2.

TABLE 2

| | Batch 1 | Batch 2 | Batch 3 |
| --- | --- | --- | --- |
| Mean $<l>$ (μm) | 15.7 | 16.1 | 15.8 |
| $<l^2>$ (μm$^2$) | 305 | 304 | 300 |
| Minimum (μm) | 0.6 | 0.6 | 0.6 |
| Maximum (μm) | 77.3 | 51.0 | 55.6 |
| 90$^{th}$ percentile (μm) | 24.8 | 25.0 | 24.7 |
| 95$^{th}$ percentile (μm) | 28.5 | 28.0 | 28.2 |
| count | 5899 | 1745 | 3710 |

Example 4

Determination of Diameter Distribution

A sample of nanowires was randomly collected from each batch to determine their diameter distribution. The nanowire widths in each sample were measured and analyzed using SEM and Clemex softwares, as described herein Table 3 shows the diameter distributions of nanowires prepared in three different batches.

TABLE 3

| Bin range (nm) | Batch 1 | Batch 2 | Batch 3 |
| --- | --- | --- | --- |
| 0-5 | 0.0% | 0.0% | 0.0% |
| 5-10 | 0.0% | 0.0% | 0.0% |
| 10-15 | 0.0% | 0.0% | 0.0% |
| 15-20 | 0.5% | 2.2% | 0.6% |
| 20-25 | 11.4% | 16.2% | 20.2% |
| 25-30 | 45.5% | 45.9% | 46.2% |
| 30-35 | 32.7% | 27.0% | 24.9% |
| 35-40 | 7.9% | 6.5% | 8.1% |
| 40-45 | 2.0% | 2.2% | 0.0% |
| 45-50 | 0.0% | 0.0% | 0.0% |
| 50-55 | 0.0% | 0.0% | 0.0% |
| 55-60 | 0.0% | 0.0% | 0.0% |

Figure 6:
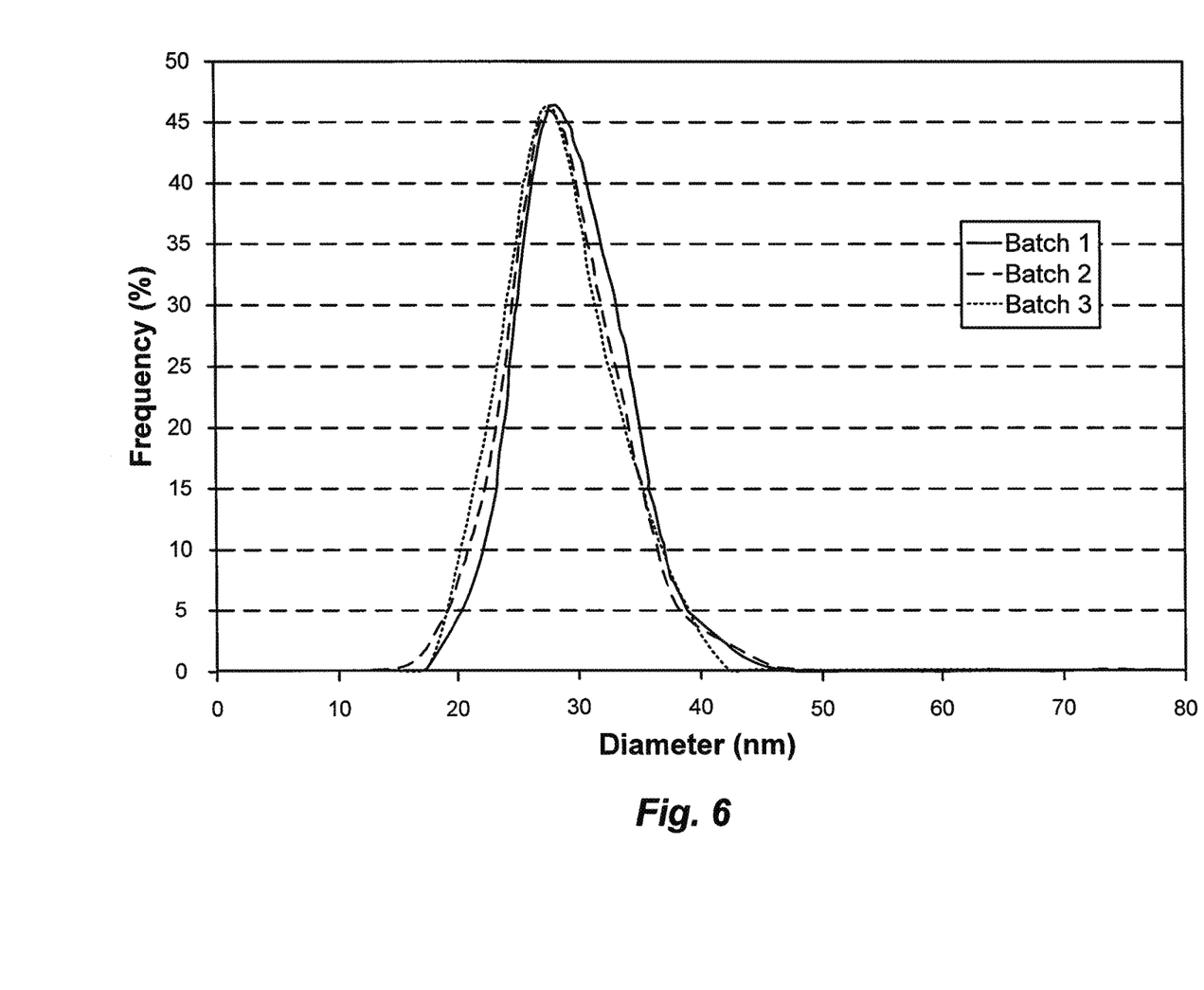
FIG. 6 illustrates the diameter distribution profiles of three batches of silver nanowires as normal or Gaussian distributions.

FIG. 6 further illustrates the diameter distribution profiles of the three batches of silver nanowires as normal or Gaussian distributions. It is demonstrated that reproducible diameter distribution profiles were obtained in nanowires prepared according to the synthesis and purification processes described herein.

The statistics of the diameters, including the standard deviations are summarized in Table 4.

TABLE 4

| | Batch 1 | Batch 2 | Batch 3 |
| --- | --- | --- | --- |
| Mean $<d>$ (nm) | 29.7 | 29.0 | 28.6 |
| Stdev (nm) | 4.3 | 4.5 | 4.3 |
| $<d^2>$ (nm$^2$) | 902 | 860 | 837 |
| Minimum (nm) | 18.7 | 18.7 | 19.7 |
| Maximum (nm) | 42.4 | 44.9 | 39.9 |
| 90$^{th}$ percentile (nm) | 34.9 | 34.6 | 34.5 |
| 95$^{th}$ percentile (nm) | 37.4 | 36.2 | 36.7 |
| Count | 202 | 185 | 173 |

Example 5

Preparation of Transparent Conductors

From each batch of silver nanowires prepared according to Examples 1 and 2, an ink composition was formulated to include, by weight, 0.1-0.2% silver nanowires, 0.2-0.4% high purity HPMC, and 0.005-0.025% Triton X-100 in DI water. The ink composition was then spin coated on a glass substrate to form thin films. More specifically, the samples were spin coated at a speed between 400 to 2000 rpm in 60 seconds, with an acceleration of 1000 rpm/s. The films were subsequently baked for 90 seconds at 50° C. followed by 90 seconds at 140° C.

By adjusting the loading amount, spin speed and time, a series of thin films were prepared based on the ink compositions of each batch.

Example 6

Transparent Conductor Specifications

The resistance, transmission and haze data for the thin films in each batch are summarized in Tables 5-7. The haze and transmission of bare glass (0.04% H and 93.4% transmission) were not subtracted.

TABLE 5

| BATCH 1 | | |
|---|---|---|
| R (ohm/sq) | % H | % T |
| 32 | 1.29% | 91.4% |
| 56 | 0.85% | 92.1% |
| 88 | 0.62% | 92.5% |
| 122 | 0.48% | 92.7% |
| 164 | 0.39% | 92.9% |
| 224 | 0.33% | 93.0% |
| 275 | 0.31% | 93.0% |

TABLE 6

| BATCH 2 | | |
|---|---|---|
| R (ohm/sq) | % H | % T |
| 34 | 1.39% | 91.1% |
| 52 | 0.95% | 91.8% |
| 68 | 0.73% | 92.2% |
| 99 | 0.53% | 92.5% |
| 163 | 0.38% | 92.8% |
| 238 | 0.32% | 92.9% |
| 340 | 0.29% | 93.0% |

TABLE 7

| BATCH 3 | | |
|---|---|---|
| R (ohm/sq) | % H | % T |
| 38 | 1.16% | 91.7% |
| 87 | 0.61% | 92.5% |
| 120 | 0.50% | 92.7% |
| 164 | 0.40% | 92.9% |
| 203 | 0.37% | 93.0% |
| 254 | 0.33% | 93.0% |

All of the films showed less than 1.5% haze, while maintaining high transmission and conductivity. In particular, films having lower than 0.4% haze and less than 350 ohm/sq in resistance were obtained.

Figure 7:
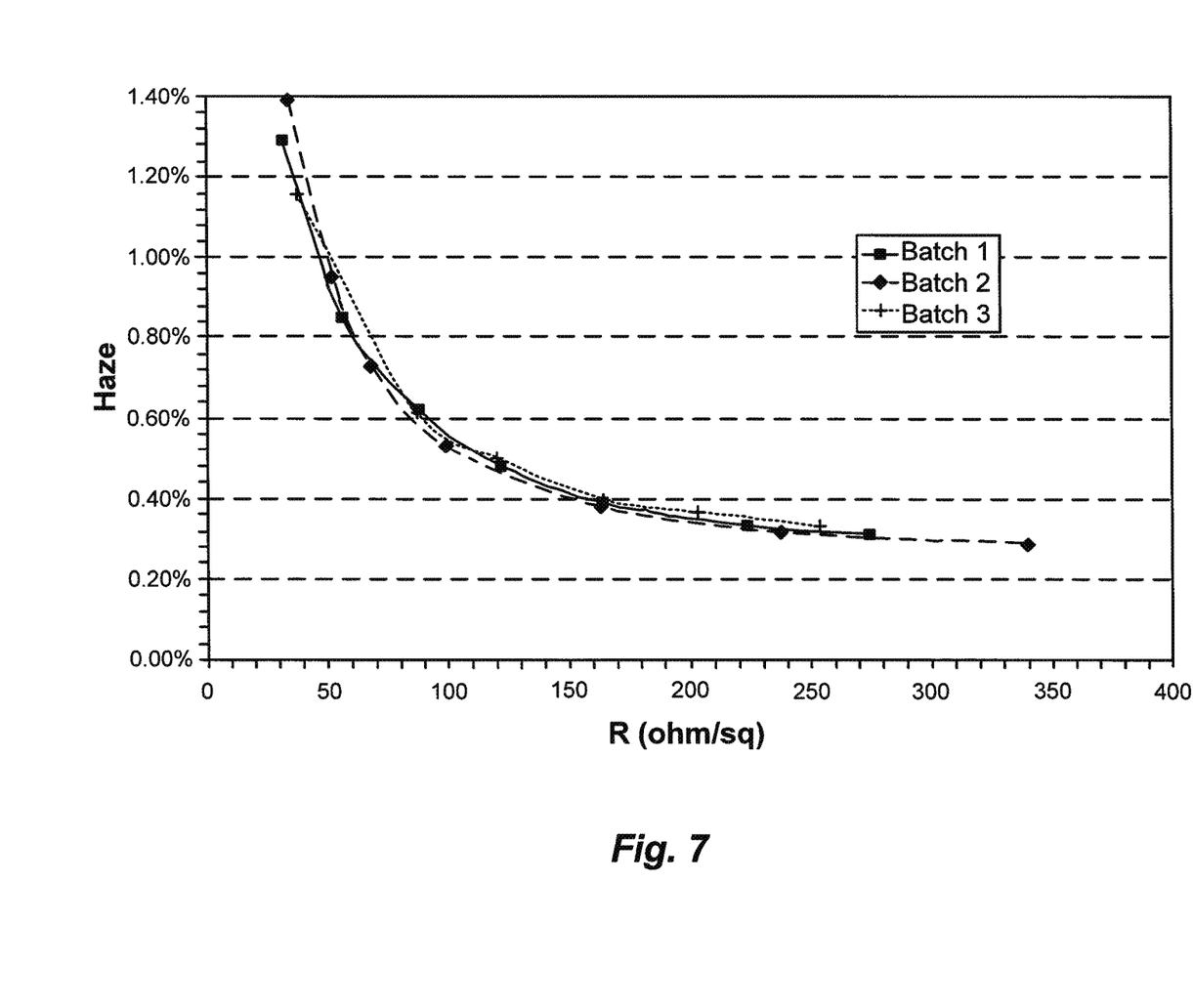
FIG. 7 shows an inverse correlation of the haze and the resistance of conductive thin films formed of silver nanowires.

Further, FIG. 7 shows the inverse correlation of the haze and the resistance of the thin films. It can be observed that as the resistance increases (i.e., fewer nanowires are present), the haze value decreases due to less scattering.

Figure 8:
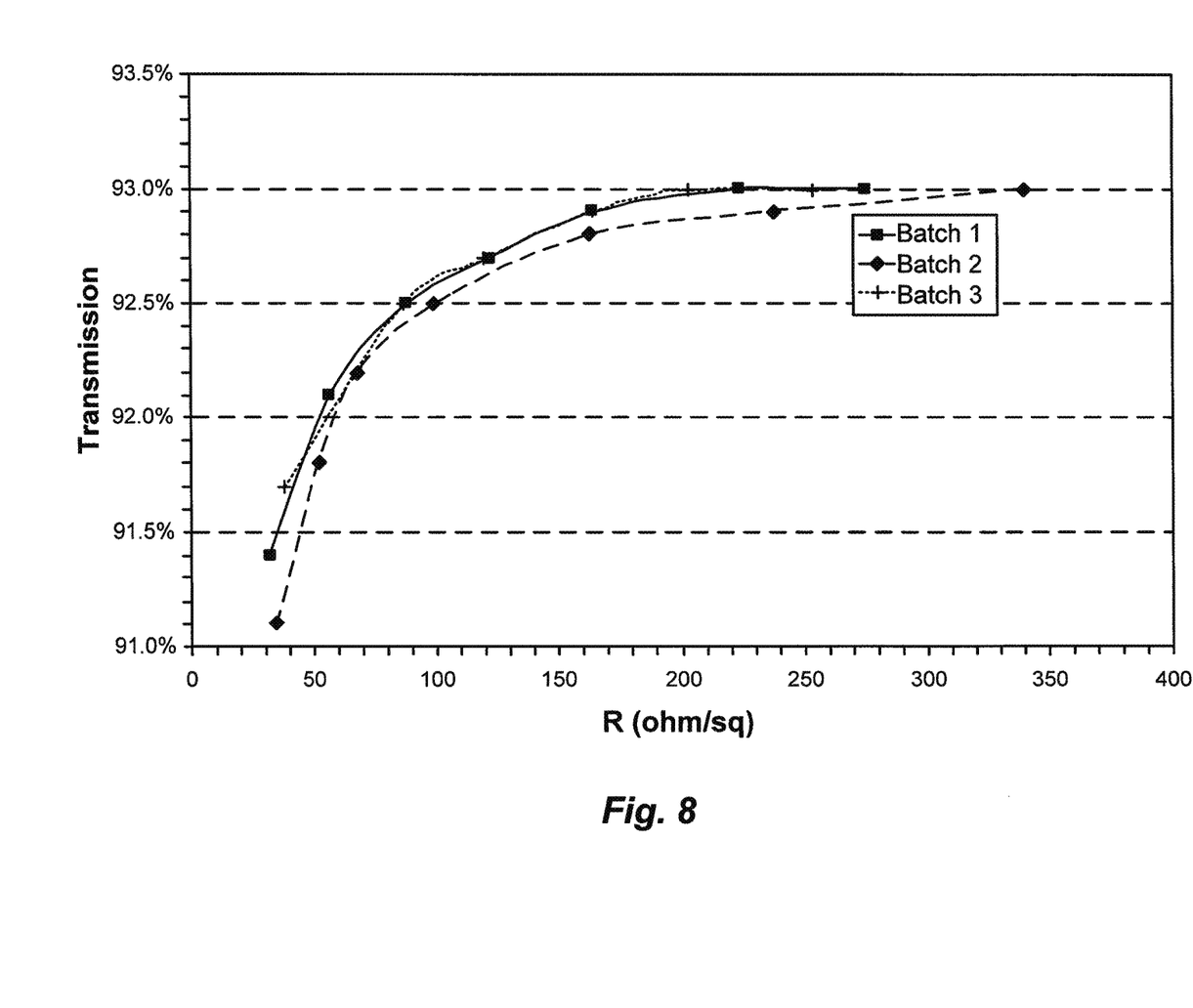
FIG. 8 shows a positive correlation of the transmission and the resistance of conductive thin films formed of silver nanowires.

FIG. 8 shows the positive correlation of the transmission and the resistance of the thin films. It can be observed that as the resistance increases (i.e., fewer nanowires are present), the transmission increases.

Example 7

Evaluation of Optical and Electrical Properties of Transparent Conductors

The transparent conductive films prepared according to the methods described herein were evaluated to establish their optical and electrical properties.

The light transmission data were obtained according to the methodology in ASTM D1003. Haze was measured using a BYK Gardner Haze-gard Plus. The sheet resistance was measured using a Fluke 175 True RMS Multimeter or contact-less resistance meter, Delcom model 717B conductance monitor. A more typical device is a 4 point probe system for measuring resistance (e.g., by Keithley Instruments).

The haze and transmission of the bare substrate (e.g., 0.04% haze and 93.4% transmission for glass) were typically included in the measurements.

The interconnectivity of the nanowires and an areal coverage of the substrate can also be observed under an optical or scanning electron microscope.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method comprising: growing metal nanowires from a reaction solution including a metal salt and a reducing agent, wherein the growing includes:
   reacting a first portion of the metal salt and the reducing agent in the reaction solution for a first period of time, wherein the first portion of the metal salt is reduced and grows in both a radial direction and an axial direction to form a plurality of precursors of metal nanowires; and
   gradually adding a second portion of the metal salt over a second period of time while maintaining a substantially constant concentration of less than 0.1% w/w of the metal salt in the reaction solution, wherein the plurality of precursors of metal nanowires predominantly grow in the axial direction to form the metal nanowires.

2. The method of claim 1 wherein the metal nanowires are silver nanowires, the metal salt is silver nitrate, and the reducing agent is propylene glycol.

3. The method of claim 1 wherein reacting a first portion of the metal salt and the reducing agent in the reaction solution for the first period of time includes:
   adding a fraction of the first portion of the metal salt with an ammonium salt; and
   adding a remainder of the first portion of the metal salt.

4. The method of claim 3 wherein the ammonium salt is tetra-n-butylammonium chloride (TBAC).

5. The method of claim 3 wherein the fraction of the first portion of the metal salt represents about 0.6% of metal salt.

6. The method of claim 3 wherein the fraction of the first portion of the metal salt represents about 0.001% to 0.025% w/w of metal ions in the reaction solution.

7. The method of claim 1 wherein the first portion and the second portion of the metal salt are about equal amounts.

8. The method of claim 1 wherein the reaction solution further includes polyvinylpyrrolidone.

9. The method of claim 1 further including, after adding the second portion of the metal salt over the second period of time, allowing the reaction solution to run; and arresting growth of the metal nanowires by quenching the reaction solution with water.

10. The method of claim 1, wherein the metal nanowires have a mean diameter of about 29 nm.

\* \* \* \* \*